United States Patent
Yamanaka et al.

(10) Patent No.: US 11,327,174 B2
(45) Date of Patent: May 10, 2022

(54) SENSOR CONTROL DEVICE

(71) Applicant: HOSIDEN CORPORATION, Osaka (JP)

(72) Inventors: Yoshifumi Yamanaka, Osaka (JP); Kiyoshi Miyazawa, Osaka (JP)

(73) Assignee: Hosiden Corporation, Osaka (JP)

( * ) Notice: Subject to any disclaimer, the term of this patent is extended or adjusted under 35 U.S.C. 154(b) by 0 days.

(21) Appl. No.: 16/794,420

(22) Filed: Feb. 19, 2020

(65) Prior Publication Data

US 2020/0271781 A1   Aug. 27, 2020

(30) Foreign Application Priority Data

Feb. 22, 2019   (JP) .............................. JP2019-030425

(51) Int. Cl.
| | | |
|---|---|---|
| *B60Q 1/00* | (2006.01) | |
| *G01S 15/87* | (2006.01) | |
| *G01S 7/00* | (2006.01) | |
| *G01S 15/06* | (2006.01) | |
| *G01S 15/66* | (2006.01) | |
| *G01S 15/931* | (2020.01) | |

(52) U.S. Cl.
CPC ............ *G01S 15/876* (2013.01); *G01S 7/003* (2013.01); *G01S 15/06* (2013.01); *G01S 15/66* (2013.01); *G01S 15/931* (2013.01); *G01S 2015/937* (2013.01)

(58) Field of Classification Search
CPC ........ G01S 15/876; G01S 7/003; G01S 15/06; G01S 15/66; G01S 15/931; G01S 2015/937

USPC ........................................................ 340/435
See application file for complete search history.

(56) References Cited

U.S. PATENT DOCUMENTS

| 5,649,311 | A | * | 7/1997 | Somei | ..................... | G01R 23/15 |
|---|---|---|---|---|---|---|
| | | | | | | 455/188.1 |
| 2005/0164629 | A1 | * | 7/2005 | Hirai | ...................... | H04H 40/90 |
| | | | | | | 455/3.02 |
| 2005/0170808 | A1 | * | 8/2005 | Hamilton | ............ | H04L 12/2854 |
| | | | | | | 455/404.1 |
| 2011/0023691 | A1 | * | 2/2011 | Iwase | ...................... | G10H 1/40 |
| | | | | | | 84/612 |

(Continued)

FOREIGN PATENT DOCUMENTS

JP   2003-141693 A   5/2003

*Primary Examiner* — Naomi J Small
(74) *Attorney, Agent, or Firm* — Dilworth & Barrese, LLP

(57) ABSTRACT

A sensor control device includes a plurality of drive units for oscillating respective transducers included in a plurality of ultrasonic sensors, a driving signal generation section for generating driving signals capable of oscillating the respective plurality of transducers, a control unit having a control signal output section for outputting, to each one of the plurality of drive units, a control signal as an input command for the driving signal to the respective transducer and a bus line configured to connect the control unit to the plurality of drive units in form of a daisy-chain, the bus line being used for bidirectional communication of communication data between the control unit and the plurality of drive units based on preset time-division, the communication data being comprised of a data structure having a first band that allows superimposition of audio data thereon. Control data based on the control signal is included in the first band.

14 Claims, 2 Drawing Sheets

(56) References Cited

U.S. PATENT DOCUMENTS

| | | | |
|---|---|---|---|
| 2011/0033061 A1* | 2/2011 | Sakurada | G10H 3/186 |
| | | | 381/81 |
| 2013/0083931 A1* | 4/2013 | Higure | H04R 3/00 |
| | | | 381/56 |
| 2014/0159629 A1* | 6/2014 | Ko | H02P 6/32 |
| | | | 318/400.23 |
| 2015/0019230 A1* | 1/2015 | Zhao | G10L 19/018 |
| | | | 704/500 |
| 2016/0269760 A1* | 9/2016 | Kageyama | H04N 21/4622 |
| 2016/0332625 A1* | 11/2016 | Fukudome | B60W 30/18 |
| 2017/0222829 A1* | 8/2017 | Kessler | H04L 12/43 |
| 2018/0015875 A1 | 1/2018 | May et al. | |
| 2018/0205887 A1* | 7/2018 | Ishikawa | H04N 5/2253 |
| 2019/0300046 A1* | 10/2019 | Hirayama | B62D 5/0406 |
| 2020/0039320 A1* | 2/2020 | Hwang | B60H 1/00735 |

\* cited by examiner

SENSOR CONTROL DEVICE

CROSS REFERENCE TO RELATED APPLICATION

This application is based on and claims priority under 35 U.S.C. Section 119 to Japanese Patent Application No. 2019-030425 filed on Feb. 22, 2019, the entire content of which is incorporated therein by reference.

TECHNICAL FIELD

This disclosure relates to a sensor control device configured to drive a plurality of ultrasonic sensors for detecting objects present in the surrounding of a vehicle.

RELATED ART

Conventionally, for the purpose of assisting driving of a vehicle, a sensor for detecting an object present in the surrounding of a vehicle has been mounted on the vehicle. For instance, a plurality of such sensors are mounted on the vehicle in order to carry out detection over a wide area in the surrounding of the vehicle. As a technique relating to a vehicle mounting such plurality of sensors is known from e.g. JP2003-141693A.

JP2003-141693A discloses a vehicle safety confirming device configured to confirm safety of driving with installing obstacle sensors in spaced relationship with each other at a rear portion, a front portion and/or side portions of a traveling vehicle body. This vehicle safety confirming device is provided with a plurality of obstacle sensors (a right lower obstacle sensor, a right upper obstacle sensor, a left upper obstacle sensor, a left lower obstacle sensor and further obstacle sensors installed at other portions) in the traveling vehicle body; and these obstacle sensors are connected via a switching connection section to a control section for managing operations of the entire vehicle safety confirming device.

SUMMARY

In the technique disclosed in JP2003-141693A, the plurality of obstacle sensors are installed at rear portions of a large vehicle and connected to the control section individually in one-to-one relationship. On the other hand, in recent years, advantageous reduction in fuel consumption of a vehicle, weight reduction and compactization of mounted components have been striven for. In view of mounting to a vehicle, the technique of JP2003-141693A is disadvantageous in that the weight of connection lines (cables) required increases in correspondence with the number of the obstacle sensors as these respective plurality of obstacle sensors are connected individually in one-to-one relationship with the control section.

Embodiments of the present invention comprise a sensor control device that allows weight reduction.

According to this disclosures, there is proposed a sensor control device configured to drive a plurality of ultrasonic sensors for detecting objects present in the surrounding of a vehicle, the sensor control device comprising:

a plurality of drive units for oscillating respective transducers included in the plurality of ultrasonic sensors;

a driving signal generation section for generating driving signals capable of oscillating the respective plurality of transducers;

a control unit having a control signal output section for outputting, to each one of the plurality of drive units, a control signal as an input command for the driving signal to the respective transducer; and a bus line configured to connect the control unit to the plurality of drive units in form of a daisy-chain, the bus line being used for bidirectional communication of communication data between the control unit and the plurality of drive units based on preset time-division, the communication data being comprised of a data structure having a first band that allows superimposition of audio data thereon;

wherein control data based on the control signal is included in the first band.

In this case, the bus line usable for transmission and reception of audio data can be utilized for controlling of the ultrasonic sensors. Further, since the plurality of drive units are connected with use of a bus line, integration of controlling of the plurality of ultrasonic sensors is possible. Moreover, since the driving signal generation section and the plurality of drive units are connected via a daisy-chain configuration, simplification and weight reduction of connections are made possible also.

Further, according to one preferred embodiment of the sensor control device, it may be arranged such that driving data based on the driving signal is included in a second band that is distinct from the first band and that also is included in the communication data transmitted from the control unit to the respective drive unit.

In this case, even if the driving signal generation section is incorporated within the control unit, the driving signal can be transmitted to the respective drive unit appropriately.

Further, according to one preferred embodiment of the sensor control device, it may be arranged such that the drive unit is configured to generate a reflection signal based on a reflection wave acquired by the ultrasonic sensor and reflection data based on the reflection signal is included in a second band that is distinct from the first band and that also is included in the communication data transmitted from the respective drive unit to the control unit.

In this case, even if a functional section for analyzing the reflection wave is incorporated within the control unit, the reflection signal can be transmitted to the control unit appropriately.

Further, according to one preferred embodiment of the sensor control device, the bus line comprises a vehicle-mounted audio bus.

In this case, since an audio bus for communicating audio signals among audio devices mounted on the vehicle can be utilized for controlling of the ultrasonic sensors, cost reduction is made possible.

DESCRIPTION OF EMBODIMENTS

A sensor control device relating to this disclosure seeks for weight reduction through ingenious control of driving of a plurality of ultrasonic sensors mounted on a vehicle. Next, a sensor control device 1 relating to the instant embodiment will be explained.

Figure 1:
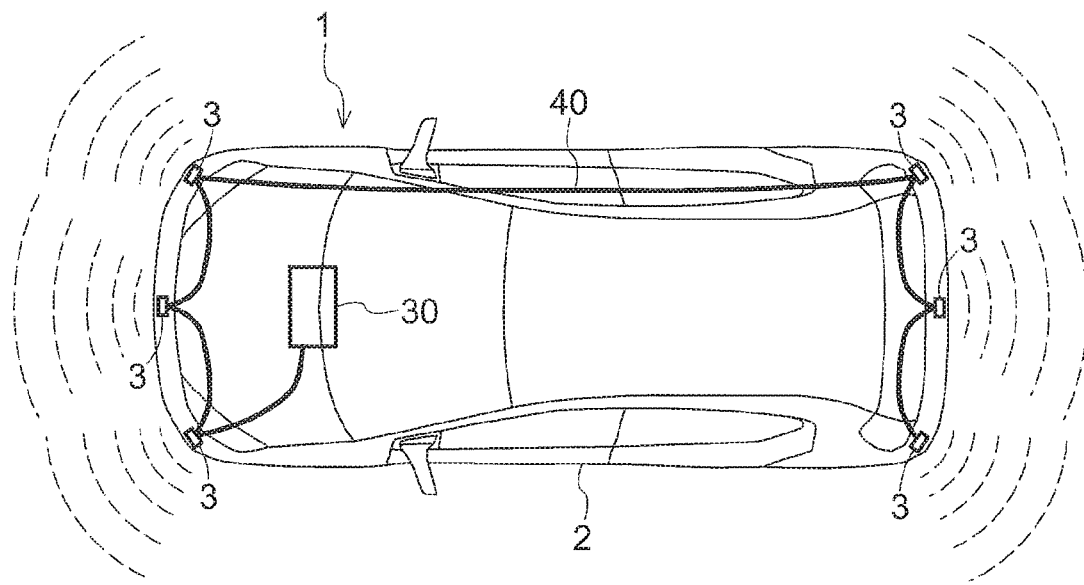
FIG. 1 shows an example of mounting ultrasonic sensors on a vehicle.

FIG. 1 is a view showing an example of mounting ultrasonic sensors 3 controlled by the sensor control device 1 according to the instant embodiment on a vehicle 2. The vehicle 2 mounts a plurality of such ultrasonic sensors 3 configured to detect objects present in the surrounding of this vehicle 2. Here, such "object" present in the surround of the vehicle 2 refers to an object which a driver of the vehicle 2 should be made aware of when traveling or parking the vehicle 2. Such object is not limited to a stationary object, but includes also a moving object such as other vehicle, a human, a bicycle, etc. Each ultrasonic sensor 3 is configured to detect presence/absence of such object or a distance to the object, based on a period from emission of an ultrasonic wave thereto and reflection and returning of the ultrasonic wave therefrom. As such ultrasonic sensor per se is known in the art, detailed explanation thereof will be omitted herein.

In the example shown in FIG. 1, the ultrasonic sensors 3 are installed at six locations, namely, at a front left end portion, a front center portion, a front right end portion, a rear left end portion, a rear center portion and a rear right end portion of the vehicle 2. Needless to say, the ultrasonic sensors 3 may be installed at other locations than the above or one or some of the ultrasonic sensors 3 at the above six locations may be omitted. The sensor control device 1 controls driving of such ultrasonic sensors 3.

Figure 2:
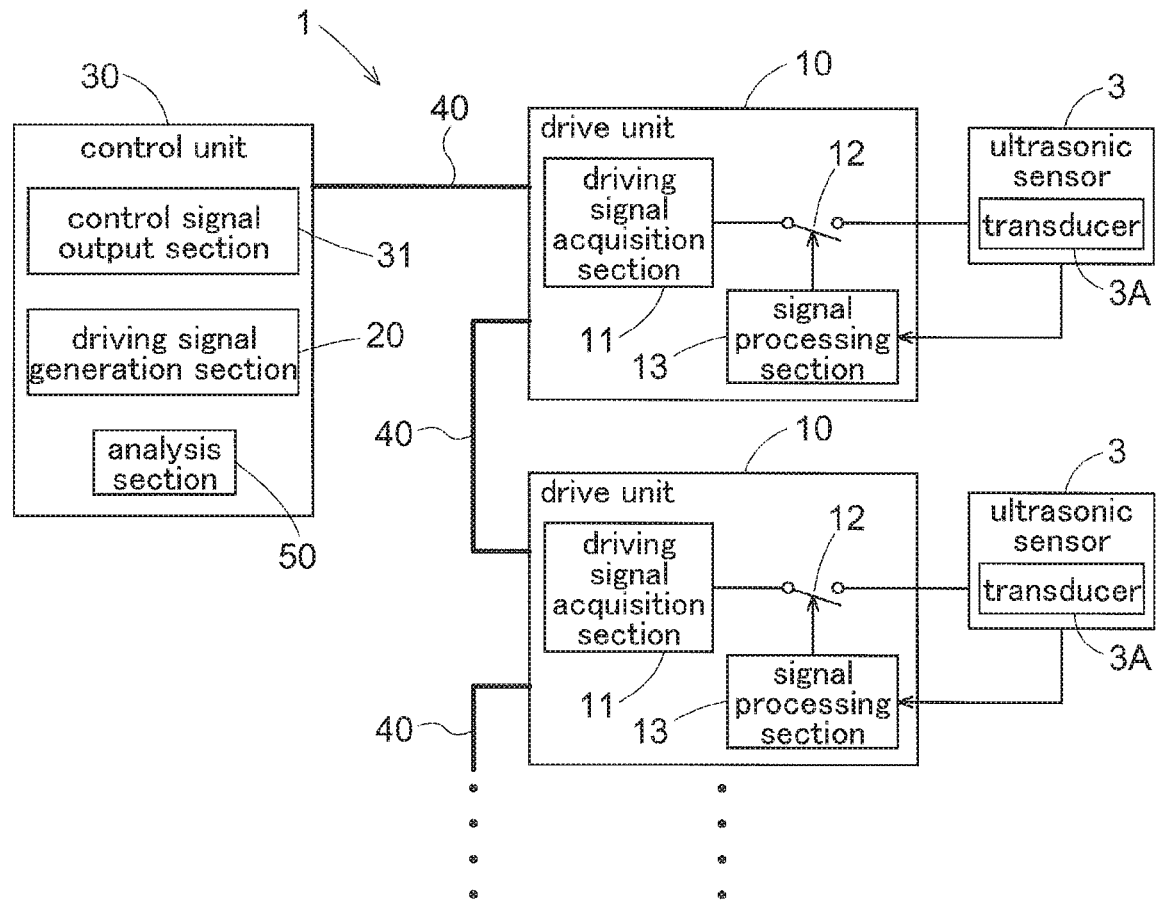
FIG. 2 is a block diagram showing a configuration of a sensor control device.
Figure 3:
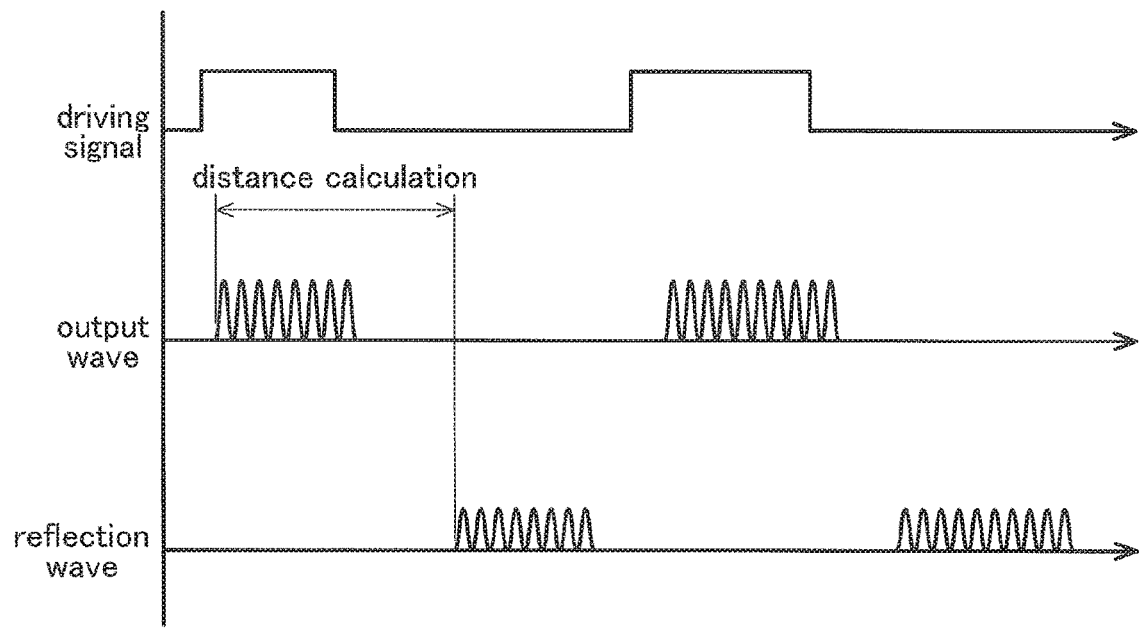
FIG. 3 shows signal waveforms of respective parts representing operations of the sensor control device.

FIG. 2 is a block diagram schematically showing the configuration of the sensor control device 1. FIG. 3 shows signal waveforms of respective parts representing operations of the sensor control device 1. The sensor control device 1, as shown in FIG. 2, includes respective functional sections consisting essentially of a drive unit 10, a driving signal generation section 20, a control unit 30 and a bus line 40. In the instant embodiment, the driving signal generation section 20 is incorporated within the control unit 30.

The drive unit 10 oscillates a transducer 3A included in each one of the ultrasonic sensors 3. Here, what is referred to as the "transducer 3A" above represents one (a transducer) incorporated within the ultrasonic sensor 3 and providing a function of converting an electric signal into an ultrasonic wave and a further function of converting an ultrasonic wave into an electric signal. As such transducer 3A is known in the art, detailed explanation thereof will be omitted herein. The drive unit 10 oscillates the transducer 3A in accordance with a control signal from a control signal output section 31 which will be explained later herein. Here, the drive unit 10 is provided in one-to-one relationship with the transducer 3A. Thus, the drive units 10 will be provided in correspondence in the number with the number of transducers 3A. In the instant embodiment, as a plurality (six) of ultrasonic sensors 3 are provided, a corresponding plurality (six) of the drive units 10 are provided also.

The driving signal generation section 20 generates a driving signal capable of oscillating each one of a plurality of transducers 3A. As described above, such transducer 3A is included in each one of the plurality of ultrasonic sensors 3, and the plurality of transducers 3A are oscillated by a plurality of drive units 10 respectively. Thus, the driving signal generated by the driving signal generation section 20 corresponds to a signal for oscillating the transducer 3A included in each one of the plurality of drive units 10. The driving signal generation section 20 generates such driving signal and outputs it to the drive unit 10. FIG. 3 shows an example of such driving signal. In the example shown in FIG. 3, there is shown a driving signal comprised of a pulse signal which becomes high in accordance with a period for oscillating the transducer 3A. Since the transducer 3A not only emits an ultrasonic wave, but also acquires its reflection wave, the driving signal is not outputted constantly, but outputted by predetermined time interval. The driving signal generation section 20 may output driving signals to the plurality of drive units 10 at one time, or may output a driving signal to each drive unit 10 individually with a time difference provided between the successive driving signals. In either case, as indicated by output waveforms in FIG. 3, an ultrasonic wave is outputted from each ultrasonic sensor 3 in accordance with the driving signal. The drive unit 10 described above receives the driving signal from the driving signal generation section 20 and boosts the drivability of this driving signal by an unillustrated driver to drive the transducer 3A.

In the instant embodiment, in addition to the driving signal generation section 20 described above, the control signal output section 31 also is incorporated within the control unit 30. This control signal output section 31 is configured to output a control signal acting as an "input command" for the driving signal for the transducer 3A, for each one of the plurality of drive units 10.

Here, in the instant embodiment, as shown in FIG. 2, each one of the plurality of drive units 10 includes a driving signal acquisition section 11, a switch 12 and a signal processing unit 13. The driving signal acquisition section 11 acquires a driving signal generated by the driving signal generation section 20 described above. The switch 12 is provided between the driving signal acquisition section 11 and the ultrasonic sensor 3 (transducer 3A) and provides transmission of the driving signal from the driving signal acquisition section 11 to the transducer 3A and transmission blocking of the driving signal from the driving signal acquisition section 11 to the transducer 3A. The signal processing section 13 acquires a control signal outputted from the control signal output section 31 and controls opening/closing of the switch 12.

Therefore, in case the control signal acquired by the signal processing section 13 from the control signal output section 31 is a signal indicating rendering of the switch 12 into its closed state, the driving signal will be transmitted form the driving signal acquisition section 11 to the transducer 3A. Whereas, in case the control signal acquired by the signal processing section 13 from the control signal output section 31 is a signal indicating rendering of the switch 12 into its opened state, the driving signal from the driving signal acquisition section 11 to the transducer 3A will be blocked in its transmission.

The bus line 40 connects the control unit 30 with the plurality of drive units 10 in the form of a daisy-chain. In the instant embodiment, the control unit 30 incorporates therein the driving signal generation section 20 and the control signal output section 31 which were described above. The plurality of drive units 10 each includes the driving signal acquisition section 11, the switch 12 and the signal processing section 13 described above. The connection in the form of a daisy-chain refers to a method of connecting devices such as electric devices via a cable, more particularly, refers to series connection of the plurality of devices in the form of linkage thereof in a row. In the plurality of devices connected in the form of linkage thereof in a row, the more downstream side a device is disposed as seen from the output source of the signal, the more relaying via the other devices (i.e. the devices on the upstream side relative thereto). Various standards are known, respecting such daisy-chain type connection. But, as these are known in the art, explanation thereof will be omitted herein. In the instant embodiment, the control unit 30 and the plurality of drive units 10 are connected via such linkage thereof in a row.

Between the control unit 30 and each one of the plurality of drive unit 10, bidirectional communication of communication data is carried out via the bus line 40. This bus line 40 is constituted of a twist-pair cable and with use of this twist-pair cable, bidirectional communication in LVDS (Low Voltage Differential Signaling) method is implemented for instance. The bus line 40 is laid inside the vehicle 2 as illustrated in FIG. 1. Therefore, the control unit 30 and each one of the plurality of drive units 10 provided at the respective locations in the vehicle 2 can carry out transmission/reception of communication data.

Figure 4:
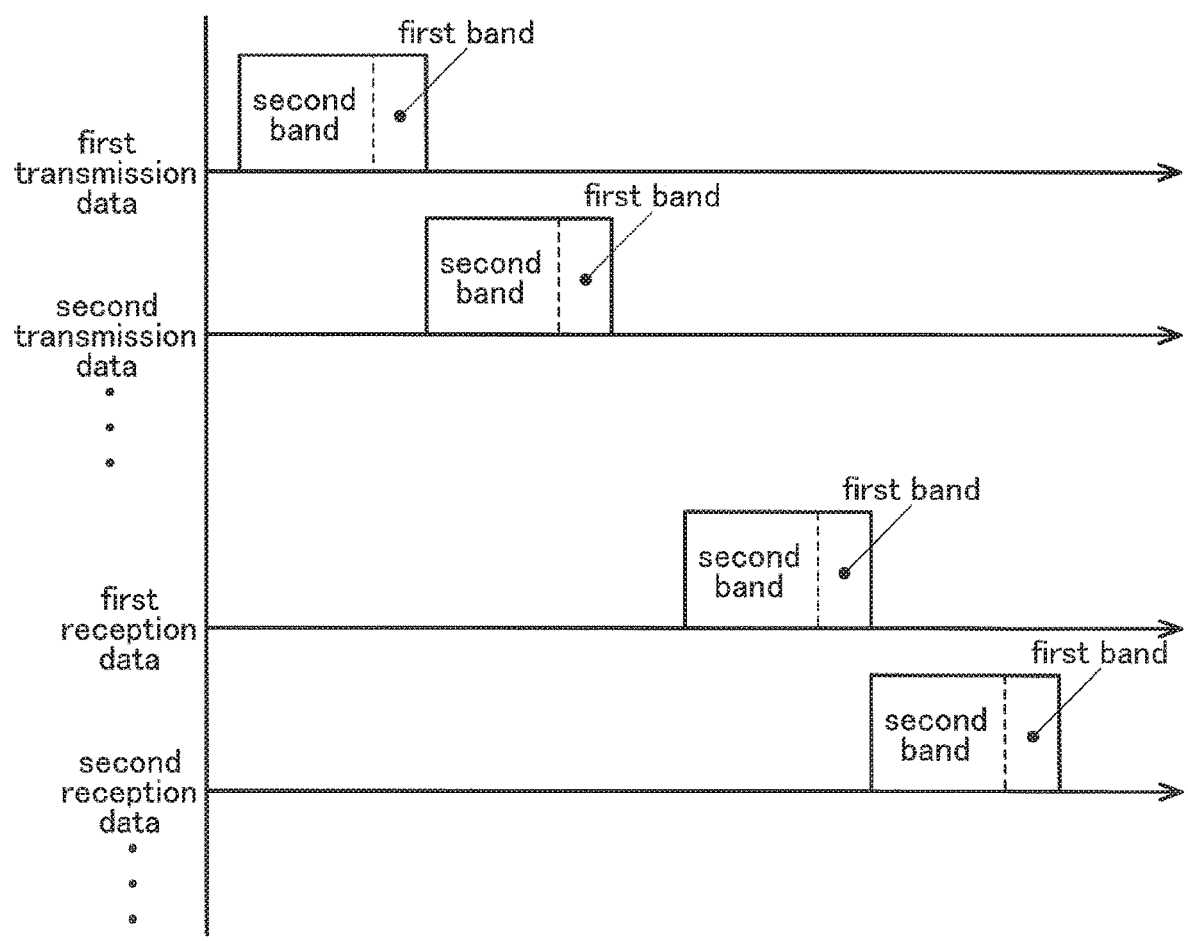
FIG. 4 is a timing chart relating to transmission/reception of communication data.

FIG. 4 shows an example of communication data to be subjected to the bidirectional communication between the control unit 30 and the respective plurality of drive units 10. Here, for the sake of easier understanding, communication data transmitted from the control unit 30 to one predetermined drive unit 10 among the plurality of drive units 10 is shown as a first transmission data. Communication data transmitted from the control unit 30 to a further predetermined drive unit 10 different from the above-described predetermined drive unit is shown as a second transmission data. Communication data transmitted from the above-described predetermined drive unit 10 to the control unit 30 is shown first reception data. Communication data transmitted from the above-described further predetermined drive unit 10 to the control unit 30 is shown as second reception data.

These respective data are communicated based on a preset time division. More particularly, as shown in FIG. 4, each data will be communicated as being arranged timewise. Incidentally, although the communication data are transmitted/received based on such time division as described above, it is possible to make delay occurring in the transmission/reception of each data negligible, by appropriate setting of the cycle of each data at some tens of micro seconds approximately for instance.

Further, each data in the instant embodiment is constituted of a data structure having a first band and a second band. The first band is a band that allows superimposition of audio data thereon, so that transmission and reception of audio data between audio modules mounted on the vehicle 2 is possible via the bus line 40. Here, such audio modules mounted on the vehicle 2 correspond to devices including a player for playing voice or sound, a speaker for outputting voice or sound, a microphone for collecting voice or sound, etc. Needless to say, other devices such as an acceleration sensor may be included also. And, transmission of audio signals between such devices is possible via the bus line 40. Incidentally, the bus line 40 may be used actually in transmission/reception of audio signals between such devices, or it may not be used.

For instance, in case transmission/reception of audio data is carried out between a player and a speaker with using the bus line 40 or in case transmission/reception of audio data is carried out between a microphone and a speaker, it is possible to arrange such that the second band is caused to include data representing identification information which allows identification of the device of transmission destination and the first band is caused to include audio data to be used in the device of the transmission destination.

The control signal outputted from the above-described control signal output section 31 is converted into control data based on this control signal and this control data as being included in the first band will be transmitted to the respective drive unit 10 from the control unit 30. Therefore, the signal processing section 13 acquires the control signal from the control data included in the first band of the first transmission data or the second transmission data.

In the instant embodiment, the driving signal generation section 20 is also incorporated within the control unit 30. Here, the driving signal generated by the driving signal generation section 20 is converted into driving data based on this driving signal and this driving data is included in the second band distinct from the first band in the communication data (the first transmission data or the second transmission data described above) transmitted from the control unit 30 to the drive unit 10. Thus, the driving signal acquisition section 11 acquires the driving signal from the driving data included in the second band of the first transmission data or the second transmission data.

On the other hand, the ultrasonic wave emitted from the ultrasonic sensor 3, when reaching an object if any of interest, will be reflected by that object and then returned to the transducer 3A, as indicated by the reflection wave shown in FIG. 3. This reflection wave will be converted into an electric signal by the transducer 3A and the resultant converted electric signal will be transmitted to the signal processing section 13. Then, the signal processing section 13 generates a reflection signal based on this electric signal (the reflection wave acquired by the ultrasonic sensor 3. Further, this reflection signal is converted into reflection data based on the reflection signal and this will be included in the second band distinct from the first band in the communication data (the first reception data or the second reception data described above) to be transmitted from the drive unit 10 to the control unit 30.

The reflection data will be transmitted via the bus line 40 from the drive unit 10 to an analysis section 50. Then, the analysis section 50 acquires the reflection signal from the reflection data included in the second band of the first reception data or the second reception data. And, based on this reflection signal, the analysis section 50 proceeds to calculate a distance from the vehicle 2 (the ultrasonic sensor 3) to the object of interest.

Based on the driving signal and the electric signal, the analysis section 50 determines or calculates presence/absence of any object of interest or the distance to the object of interest if any. More particularly, based on a time difference from the output of the ultrasonic wave as the output wave to the acquisition of its reflection wave, the distance to the object will be calculated. Incidentally, while the transducer 3A acquires the reflection wave, the drive unit 10 (signal processing section 13) amplifies the reflection wave and transmits to the analysis section 50 an electric signal configured to oscillate with a predetermined potential difference.

Here, in the instant embodiment, as such bus line 40 as described above, a car (vehicle)-mounted audio bus is employed. Such car (vehicle)-mounted audio bus is mounted on the vehicle 2 and utilized for transmission/reception of audio signals. In the inventive sensor control device 1, driving of the ultrasonic sensors 3 is controlled with use of this vehicle-mounted audio bus. Specifically, the bus line 40 can employ the A2B (registered trademark). With this, weight reduction and cost reduction of the bus line 40 are made possible.

With the above-described configuration, it becomes possible for the sensor control device 1 to control the plurality of ultrasonic sensors 3. Further, since the control unit 30 and the plurality of drive units 10 are connected to each other with use of the bus line 40 in the daisy-chain form, wiring arrangement/layout can be made simple, so that the further weight reduction of the sensor control device 1 is made possible.

Other Embodiments

In the foregoing embodiment, the bus line 40 was constituted of using a vehicle-mounted audio bus. However, the bus line 40 may be constituted of using a vehicle (car)-mounted network cable.

In the foregoing embodiment, it was explained that the analysis section 50 is provided for calculating a distance to an object. However, an arrangement is possible with omission of such analysis section 50. In this case, advantageously, it may be arranged such that the electric signal converted from the reflection wave by the transducer 3A is transmitted by the sensor control device 1 to a device which determines the distance to this object.

In the foregoing embodiment, it was explained that the driving signal generation section 20 is incorporated within the control unit 30. Instead, the driving signal generation section 20 may be provided as a separate entity from the control unit 30. In such case too, driving data based on the driving signal can be transmitted via the bus line 40 to the drive unit 10. Further alternatively, the driving signal generation section 20 may be incorporated within the drive unit 10. In this case, the driving signal acquisition section 11 will acquire the driving signal and can output the driving signal to the transducer 3A according to the opening/closing control of the switch 12 by the signal processing section 13.

In the foregoing embodiment, it was explained that the reflection data based on the reflection signal is included in the second band. However, it is also possible to arrange such that the reflection data based on the reflection signal is transmitted from the drive unit 10 to the control unit 30 without using the bus line 40.

In the foregoing embodiment, it was explained that the communication data has a data structure having a first band and a second band. However, the communication data may have a data structure having a further band other than the first band and the second band.

This disclosure is applicable to a sensor control device configured to drive a plurality of ultrasonic sensors for detecting objects present in the surrounding of a vehicle.

The invention claimed is:

1. A sensor control device configured to drive a plurality of ultrasonic sensors for detecting objects present in the surrounding of a vehicle, the sensor control device comprising:
a plurality of drive units for oscillating respective transducers included in the plurality of ultrasonic sensors;
a driving signal generation section in each said drive unit for generating driving signals for oscillating the respective plurality of transducers;
a control unit having a control signal output section for outputting, to each one of the plurality of drive units, a control signal as an input command for the driving signal to the respective transducer; and
a bus line configured to connect the control unit to the plurality of drive units in form of a daisy-chain, the bus line being used for bidirectional communication of communication data between the control unit and the plurality of drive units based on preset time-division, the communication data being comprised of a data structure transmitted as a first band of data that allows superimposition of audio data thereon;
wherein control data based on the control signal is included in the first band of transmitted data,
the driving signal is transmitted in a second band of data and is sent to the driving unit and the control signal transmitted in the first band of data is sent to the driving unit for controlling the signals,
the drive unit is configured to generate a reflection signal based on a reflection wave acquired by the ultrasonic sensor, and
reflection data based on the reflection signal is included in a second band that is distinct from the first band and also included in the communication data transmitted from the respective drive unit to the control unit.

2. The sensor control device of claim 1, wherein driving data based on the driving signal is included in a second band that is distinct from the first band and that also is included in the communication data transmitted from the control unit to the respective drive unit.

3. The sensor control device of claim 1, wherein the bus line comprises a vehicle-mounted audio bus.

4. The sensor control device of claim 1, wherein the bus line comprises a vehicle-mounted audio bus.

5. The sensor control device of claim 1, wherein the first band containing control data and the second band containing the driving data are transmitted at the same time.

6. The sensor control device of claim 1, wherein the first and second bands do not overlap in data and have different data structure from one another.

7. The sensor control device of claim 1, wherein the second band shows the timing of transmitting the data representing identification information which allows identification of the device of transmission destination among the communication data, and the first band shows the timing of transmitting the audio data to be used in the device of the transmission destination among the communication data.

8. A sensor control device configured to drive a plurality of ultrasonic sensors for detecting objects present in the surrounding of a vehicle, the sensor control device comprising:
a plurality of drive units for oscillating respective transducers included in the plurality of ultrasonic sensors;
a driving signal generation section in each said drive unit for generating driving signals for oscillating the respective plurality of transducers;
a control unit having a control signal output section for outputting, to each one of the plurality of drive units, a control signal as an input command for the driving signal to the respective transducer; and
a bus line configured to connect the control unit to the plurality of drive units in form of a daisy-chain, the bus line being used for bidirectional communication of communication data between the control unit and the plurality of drive units based on preset time-division, the communication data being comprised of a data structure transmitted as a first band of data that allows superimposition of audio data thereon;
wherein control data based on the control signal is included in the first band of transmitted data,
a reflection signal is transmitted in a second band of data and is sent for analysis and the communication signal transmitted in the second band of transmitted data is sent to transmit the reflection signal,
the drive unit is configured to generate a reflection signal based on a reflection wave acquired by the ultrasonic sensor, and
reflection data based on the reflection signal is included in a second band that is distinct from the first band and that also is included in the communication data transmitted from the respective drive unit to the control unit.

9. The sensor control device of claim 8, wherein driving data based on the driving signal is included in a second band that is distinct from the first band and that also is included in the communication data transmitted from the control unit to the respective drive unit.

10. The sensor control device of claim 8, wherein the bus line comprises a vehicle-mounted audio bus.

11. The sensor control device of claim 8, wherein the bus line comprises a vehicle-mounted audio bus.

12. The sensor control device of claim 8, wherein the first band containing control data and the second band containing the driving data are transmitted at the same time.

13. The sensor control device of claim 8, wherein the first and second bands do not overlap in data and have different data structure from one another.

14. The sensor control device of claim 8, wherein the second band shows the timing of transmitting the data representing identification information which allows identification of the device of transmission destination among the communication data, and the first band shows the timing of transmitting the audio data to be used in the device of the transmission destination among the communication data.

* * * * *